United States Patent [19]

Ishihara et al.

[11] Patent Number: 5,616,290

[45] Date of Patent: Apr. 1, 1997

[54] GAS-LIQUID CONTACTING APPARATUS

[75] Inventors: Makiichi Ishihara; Takakazu Sunada, both of Tokyo; Shigeo Hasegawa, Hiroshima; Naohiko Ukawa, Hiroshima; Toru Takashina, Hiroshima; Yukio Kita; Kouichiro Iwashita, both of Tokyo; Kousuke Yamashita, Hiroshima; Junji Ozaki; Kaname Kaneshige, both of Hofu, all of Japan

[73] Assignees: Mitsubishi Jukogyo Kabushiki Kaisha, Tokyo; Ohji Rubber & Chemicals Co., Ltd., Hofu, both of Japan

[21] Appl. No.: 650,710

[22] Filed: May 20, 1996

Related U.S. Application Data

[62] Division of Ser. No. 413,722, Mar. 31, 1995.

[30] Foreign Application Priority Data

Apr. 11, 1994 [JP] Japan ..................... 6-072047
Dec. 13, 1994 [JP] Japan ..................... 6-308680

[51] Int. Cl.⁶ ..................................................... B05B 1/00
[52] U.S. Cl. ................. 261/115; 261/118; 261/DIG. 39; 222/570; 239/550; 239/597; 239/600; 425/183
[58] Field of Search ..................... 261/76, 78.1, 115, 261/116, 117, 118, DIG. 39, DIG. 75; 425/183, 190, 461; 248/75; 222/567, 573, 570; 239/596, 597, 601, 542, 550, 600

[56] References Cited

U.S. PATENT DOCUMENTS

| | | | |
|---|---|---|---|
| 3,953,555 | 4/1976 | Coley | 239/550 |
| 4,925,508 | 5/1990 | Goto et al. | 264/46.6 |
| 4,960,601 | 10/1990 | Cummins | 425/204 |
| 5,071,331 | 1/1994 | Morton et al. | 261/118 |
| 5,338,496 | 8/1994 | Talbot et al. | 261/118 |

FOREIGN PATENT DOCUMENTS

| | | |
|---|---|---|
| 228588 | 3/1959 | Australia . |
| 369876 | 5/1990 | European Pat. Off. . |
| 205745 | 12/1996 | European Pat. Off. . |
| 4109567 | 9/1992 | Germany . |
| 59-53828 | 4/1984 | Japan . |
| 2196877 | 5/1988 | United Kingdom . |

*Primary Examiner*—Khanh P. Nguyen
*Attorney, Agent, or Firm*—Jacobson, Price, Holman & Stern, PLLC

[57] ABSTRACT

A gas-liquid contacting apparatus in which spray nozzles for spraying slurry solution upward are arranged in a tower body through which gas passes, wherein a liquid inlet portion of the spray nozzle is of a bell shape having a radius of curvature of 0.2 times or more of the diameter of a liquid discharge port of the spray nozzle, and a ceramic nozzle support structure comprises: (A) a ceramic nozzle having a ridge portion on the outer peripheral surface of a nozzle body; (B) a tightening flange including a flange body having an aperture larger than the outside shape of the nozzle body and a central cylindrical portion extending substantially concentrically with the nozzle body from lower surface of the flange body, the tightening flange having through holes in the wall of central cylindrical portion thereof; (C) a support nozzle consisting of a cylindrical body having an inside diameter larger than the central cylindrical portion of tightening flange and connected to the tightening flange by bolting via the flange body at the upper portion of the cylindrical body; and (D) an elastomeric resin filled in a space between the nozzle and the support nozzle so that the outside and inside of the central cylindrical portion of tightening flange are integrated via the through holes.

1 Claim, 7 Drawing Sheets

GAS-LIQUID CONTACTING APPARATUS

This is a Divisional of application Ser. No. 08/413,722 filed Mar. 31, 1995.

FIELD OF THE INVENTION AND RELATED ART STATEMENT

The present invention relates to a gas-liquid contacting apparatus used for a wet type exhaust gas desulfurizer or the like and, more particularly, to a gas-liquid contacting apparatus that improves wear resistance of spray nozzle without using expensive materials and achieves high reliability and greater economy.

Further, the present invention relates to a ceramic nozzle support structure for a gas-liquid contacting apparatus and, more particularly, to a ceramic nozzle support structure which is suitable for supporting a ceramic nozzle for spraying absorbent slurry, which is used in a spray type absorption tower for an exhaust gas desulfurizer, sufficiently withstands the load due to the reaction caused by sprayed slurry, and protects a ceramic nozzle, which is vulnerable to shocks, from damage due to a shock.

In recent years, wet type exhaust gas desulfurizers have been widely used, in which absorbent slurry absorbs sulfur dioxide in exhaust gas to remove it. In the desulfurizer of this type, it is important to efficiently bring absorbent slurry into contact with exhaust gas. For this reason, the applicant has proposed a gas-liquid contacting apparatus which achieves improved gas-liquid contact efficiency, reduced necessary volume, and simplified construction by configuring the apparatus so that slurry solution is sprayed upward in the tower body in which the gas flows, as disclosed in Japanese Utility Model Provisional Publication No. 59-53828 (No. 53828/1984). FIG. 8 shows a typical exhaust gas desulfurizer (principal portion only) using this gas-liquid contacting apparatus.

This exhaust gas desulfurizer is formed at the bottom of an absorption tower 1. The exhaust gas desulfurizer includes a tank 2 to which absorbent slurry S composed of, for example, limestone is supplied from a slurry supply system (not shown), a circulating pump 4 which sends the slurry in the tank 2 to a tower body 3 formed at the upper part of the absorption tower 1 to bring the slurry into contact with exhaust gas, and a stirrer 7 which is supported on the ceiling of the tank 2 by means of a rotation shaft 5 and is rotated in the slurry by a motor 6. Ducts 8 and 9 which constitutes an inlet or an outlet for exhaust gas are provided at the upper part of the tower body 3 of the absorption tower 1 and at the upper end of the tank 2, respectively, so that exhaust gas flows in the tower body 3 through the space over the liquid surface of the tank 2.

A header pipe 10 connected to the discharge side of the circulating pump 4 is disposed in the tower body 3. On this header pipe 10, a plurality of spray nozzles 11 are formed to spray absorbent slurry S upward in a liquid column form. This provides a gas-liquid contacting apparatus in which absorbent slurry S is efficiently brought into contact with exhaust gas. Although several header pipes 10 are provided in the gas-liquid contacting apparatus for the above-mentioned desulfurizer, these pipes are not always arranged in the same plane. The liquid inlet portion of the conventional spray nozzle 11 is of a shape having acute corner. Further, when the liquid column of absorbent slurry S has a height not more than 1 m and the gypsum in absorbent slurry has a concentration not more than 15%, FRP (fiber reinforced plastic) is used as the material for the conventional spray nozzle 11. Under severe conditions, a metallic material having high hardness and wear resistance or a ceramic material such as alumina, zirconia, tungsten carbide, or silicon carbide is normally used.

In this apparatus, untreated exhaust gas is introduced through, for example, the duct 8, brought into contact with the absorbent slurry S sprayed from the spray nozzles 11 by means of the circulating pump 4 to absorb and remove sulfur dioxide gas in the untreated exhaust gas, and discharged through the duct 9 as treated exhaust gas. The absorbent slurry S, which is sprayed from the spray nozzles 11 and flows down while absorbing sulfur dioxide gas, comes in contact with many bubbles produced by the air supplying means (not shown) while being stirred by the stirrer 7 in the tank 2 and is oxidized, being taken out as gypsum (by-product).

At this time, the absorbent slurry S sprayed from the spray nozzles 11 spouts upward in a liquid column form, is scattered at the top of spout, and falls. The falling absorbent slurry S and the spouting absorbent slurry S collide with each other to form fine particles. Therefore, this absorption tower has a large gas-liquid contact area per unit volume, though having a simple construction, as compared with the filling type absorption tower. Also, the exhaust gas is effectively caught in the flow by the spout of absorbent slurry S in the vicinity of the nozzle, so that the absorbent slurry and the exhaust gas are mixed effectively, resulting in high gas-liquid contact efficiency. This provides a low-volume, simple absorption tower 1 which purifies exhaust gas with high $SO_x$ removal efficiency. Further, the liquid column height of absorbent slurry S sprayed from the spray nozzles 11 can be adjusted by setting the discharge pressure of the circulating pump 4. Therefore, the gas-liquid contact efficiency and in turn the $SO_x$ removal efficiency can be changed effectively.

In the above-described conventional gas-liquid contacting apparatus, the material cost, manufacture cost, and assembly cost of spray nozzle 11 are so high to prevent the reduction in reliability due to wear etc., depending on the conditions such as a great column height of absorbent slurry S or a high concentration of gypsum in absorbent slurry S that the economy is impaired. When the liquid column of absorbent slurry S has a height exceeding 1 m or the gypsum in absorbent slurry S has a concentration exceeding 15%, an expensive material such as a metallic material having high hardness and wear resistance or a ceramic material is normally used, leading to high material cost and manufacture cost. Especially when corrosion resistance is required, a ceramic material must be used, and a special attaching structure is needed to assure shock resistance.

In the desulfurizer for a coal burning boiler etc., solid materials such as calcium sulfite, calcium sulfate (gypsum), and fly ash (coal ash) of reaction product and sand particles in coal exist in the absorbent slurry S in the steady operation. These solid materials pass through the spray nozzle 11 more violently as the liquid column height is higher. Therefore, FRP having low wear resistance wears away in a short period of time. Also, in the desulfurizer for a coal burning boiler etc., chlorine ions exist in the absorbent slurry S, so that corrosion such as pitting or deposit attack occurs in stainless steels, depending on the chloride ion concentration. As a material which withstands such corrosion, nickel-base alloys or titanium-base alloys are available, but such alloys are expensive though having lower hardness and poorer wear resistance than stainless steels.

When high wear resistance and corrosion resistance are required, ceramics have so far been used as a material for the spray nozzle 11. However, ceramics are difficult to mold, so that their manufacture cost is high. Moreover, ceramics have poor shock resistance and are heavy, so that they are easily broken when the spray nozzle 11 is being attached to the header pipe 10. Also, the ceramic spray nozzle must have a special structure such that shock does not transmit to the support structure of the spray nozzle.

Accordingly, a first object of the present invention is to provide a gas-liquid contacting apparatus having spray nozzles which has high wear resistance, corrosion resistance, and shock resistance, light in weight, and inexpensive, and achieving high reliability and great economy.

Recently, in discharging exhaust gas from a thermal electric power plant or the like, an exhaust gas desulfurizer is installed to prevent environmental pollution by removing $SO_2$ in exhaust gas.

In the conventional exhaust gas desulfurizer, a $SO_2$ absorbent such as lime slurry is allowed to flow down in an absorption tower which is filled with a filler such as grit, and exhaust gas is introduced into the absorption tower so as to flow in the countercurrent direction or the concurrent direction with respect to the lime slurry. The $SO_2$ gas in exhaust gas is dissolved in the lime slurry to form $SO_2$ ions, and reacts with Ca ions existing in the lime slurry to yield $CaSO_4$. By removing this $CaSO_4$, $SO_2$ in exhaust gas is removed.

However, in the above-described conventional exhaust gas desulfurizer, the yielded $CaSO_4$ often deposits on the filler such as grit in the absorption tower. For this reason, the absorption capacity of the absorbent decreases, and the flow resistance of exhaust gas increases, resulting in decrease in desulfurizing performance. The removal of the yielded $CaSO_4$ from the filler requires much time and manpower. Therefore, there has been a demand for developing a gas-liquid contacting apparatus for absorbent slurry and exhaust gas in place of the filling type absorption tower which is filled with grit or other fillers.

In order to realize such a spray type absorption tower, the following problems must be solved. First, the nozzle for spraying absorbent slurry must be made of a material having high wear resistance because the absorbent slurry is highly abrasive. A nozzle made of a metal such as steels, stainless steels, or aluminum wears out excessively, so that it is difficulty to use practically. It is necessary to make a nozzle by using a hard ceramic material, which is less prone to wear, such as high-purity alumina, zirconia, silicon carbide, and tungsten carbide.

Secondly, a support structure for supporting the ceramic nozzle must be developed. The ceramic nozzle has a drawback of being vulnerable to shocks. That is to say, when being subjected to a shock, the ceramic nozzle is easily cracked, so that the ceramic nozzle cannot be fixed directly by a metallic member or other members made of a highly rigid material. Therefore, the support structure of ceramic nozzle must have a construction which supports the reaction caused by sprayed slurry and the weight of the nozzle itself, and also protects the nozzle body from the shock. Moreover, in the spray type absorption tower of exhaust gas desulfurizer, large amounts of slurry, for example, limestone slurry of 60 t per hour per one nozzle, must be sprayed. Therefore, it is necessary to develop a support structure for supporting the ceramic nozzle which can spray such large amounts of limestone slurry.

However, the support structure for supporting such a ceramic nozzle has not so far been proposed and used practically.

Accordingly, a second object of the present invention is to provide a support structure for ceramic nozzle, which sufficiently supports the reaction caused by sprayed slurry and protects the ceramic nozzle, which is vulnerable to shocks, from shocks to prevent damage.

SUMMARY OF THE INVENTION

To achieve the first object of the present invention, the gas-liquid contacting apparatus of the present invention, in which spray nozzles for spraying slurry solution upward are arranged in a tower body through which gas passes, is characterized in that a liquid inlet portion of the spray nozzle is of a bell shape having a radius of curvature of 0.2 times or more of the diameter of a liquid discharge port of the spray nozzle.

In another aspect of the present invention, the gas-liquid contacting apparatus of the present invention, in which spray nozzles for spraying slurry solution upward are arranged in a tower body through which gas passes, is characterized in that the material of the spray nozzle is polyether urethane rubber having a JIS (Japanese Industrial Standard)—A hardness of 50 to 100 or polyethylene having an average molecular weight of 1,000,000 to 4,000,000.

In another aspect of the present invention, the gas-liquid contacting apparatus of the present invention, in which spray nozzles for spraying slurry solution upward are arranged in a tower body through which gas passes, is characterized in that a liquid inlet portion of the spray nozzle is of a bell shape having a radius of curvature of 0.2 times or more of the diameter of a liquid discharge port of the spray nozzle, and the material of the spray nozzle is polyether urethane rubber having a JIS-A hardness of 50 to 100 or polyethylene having an average molecular weight of 1,000,000 to 4,000,000.

According to the present invention, the liquid inlet portion of the spray nozzle is of a bell shape having a radius of curvature of 0.2 times or more of the diameter of the liquid discharge port of the spray nozzle, so that the flow turbulence of slurry solution at the liquid inlet port and the discharge port of the spray nozzle is prevented, and wear caused by the generation of bubbles and wear caused by cavitation are inhibited independently of the material of spray nozzle.

When the material of the spray nozzle is polyether urethane rubber having a JIS-A hardness of 50 to 100 or polyethylene having an average molecular weight of 1,000,000 to 4,000,000, a lightweight, inexpensive spray nozzle with high wear resistance, corrosion resistance, and shock resistance can be provided. The reason why polyether urethane rubber having a JIS-A hardness of 50 to 100 has high wear resistance is probably because this material has energy absorption effect due to rubber elasticity. The reason why polyethylene having an average molecular weight of 1,000, 000 to 4,000,000 has high wear resistance is probably because the material has high mechanical properties and high frictional resistance.

According to the present invention, because the liquid inlet portion of the spray nozzle is of a bell shape having a radius of curvature R of 0.2 times or more of the liquid discharge port diameter, the flow turbulence of slurry solution at the liquid inlet port and the discharge port of the spray nozzle is prevented, and wear caused by the generation of bubbles and wear caused by cavitation are inhibited independently of the material of spray nozzle. Therefore, even if an inexpensive, lightweight material with high shock resistance, such as FRP, is used, the wear resistance can be assured, and the economy and reliability of the gas-liquid contacting apparatus and in turn the desulfurizer can be improved.

When the material of the spray nozzle is polyether urethane rubber having a JIS-A hardness of 50 to 100 or ultra-high-molecular-weight polyethylene having an average molecular weight of 1,000,000 to 4,000,000, a lightweight, inexpensive spray nozzle with high corrosion resistance and shock resistance is provided because of the characteristics of the material itself. At the same time, high wear resistance can be obtained. Therefore, the spray nozzle used in the present invention has a simple support structure (can be attached directly), and is easy to install and easy to mold, though having reliability as high as that of the ceramic spray nozzle in terms of wear resistance and corrosion resistance, which achieves great economy and significantly improved reliability of the gas-liquid contacting apparatus.

To achieve the second object of the present invention, the ceramic nozzle support structure of the present invention comprises: (A) a ceramic nozzle having a ridge portion on the outer peripheral surface of a nozzle body; (B) a tightening flange including a flange body having an aperture larger than the outside shape of the nozzle body and a central cylindrical portion extending substantially concentrically with the nozzle body from lower surface of the flange body, the tightening flange having through holes in the wall of central cylindrical portion thereof; (C) a support nozzle consisting of a cylindrical body having an inside diameter larger than the central cylindrical portion of tightening flange and connected to the tightening flange by bolting via the flange body at the upper portion of the cylindrical body; (D) an elastomeric resin filled in a space between the nozzle and the support nozzle so that the outside and inside of the central cylindrical portion of tightening flange are integrated via the through holes.

The ceramic nozzle support structure of the present invention can be applied independently of the kind of ceramic material used for the nozzle. It can be applied to nozzles formed of, for example, high-purity alumina, zirconia, silicon carbide (SiC), or tungsten carbide (WC), which is wear resistant.

As the elastomeric resin used in the present invention, vulcanized rubber which has high shock absorbing capability, such as natural rubber and butyl rubber, urethane rubber, silicone rubber, or expandable resin such as polystyrene foam can be used.

In the ceramic nozzle support structure of the present invention, the combination of the ridge portion provided on the outer peripheral surface of the nozzle body and the elastomeric resin functions as a stopper for resisting the reaction in the direction reverse to the spraying direction, caused by sprayed slurry, and supports the ceramic nozzle by transmitting the reaction to the support nozzle via the tightening flange.

Also, direct contact between the nozzle and the tightening flange or between the nozzle and the support nozzle is prevented because the elastomeric resin is interposed between the nozzle and the tightening flange and between the nozzle and the support nozzle. Therefore, the ceramic nozzle can be protected from damage caused by a shock.

As described above, according to the present invention, direct contact between the nozzle and the tightening flange or between the nozzle and the support nozzle is prevented because the elastomeric resin is interposed between the ceramic nozzle and the tightening flange. Therefore, the ceramic nozzle can be protected from coming into contact with the tightening flange or the support nozzle and, as a result, being damaged by cracks formed.

The elastomeric resin can absorb shocks applied to the nozzle when slurry is sprayed, and also can absorb shocks transmitted to the nozzle from the outside. Therefore, the support structure achieves the effect of completely protecting the nozzle from shocks to prevent the nozzle from damage. Moreover, since the ridge portion provided on the outer peripheral surface of the nozzle body and the elastomeric resin functions as a stopper, the reaction caused by sprayed slurry and the weight of the nozzle itself can be supported sufficiently.

The ceramic nozzle support structure in accordance with the present invention can be used suitably for a spray type absorption tower for exhaust gas desulfurizer which sprays limestone slurry, for example.

DETAILED DESCRIPTION OF PREFERRED EMBODIMENTS

The gas-liquid contacting apparatus and the nozzle support structure of the present invention will be described below by explaining specific embodiments.

First Embodiment

Figure 8:
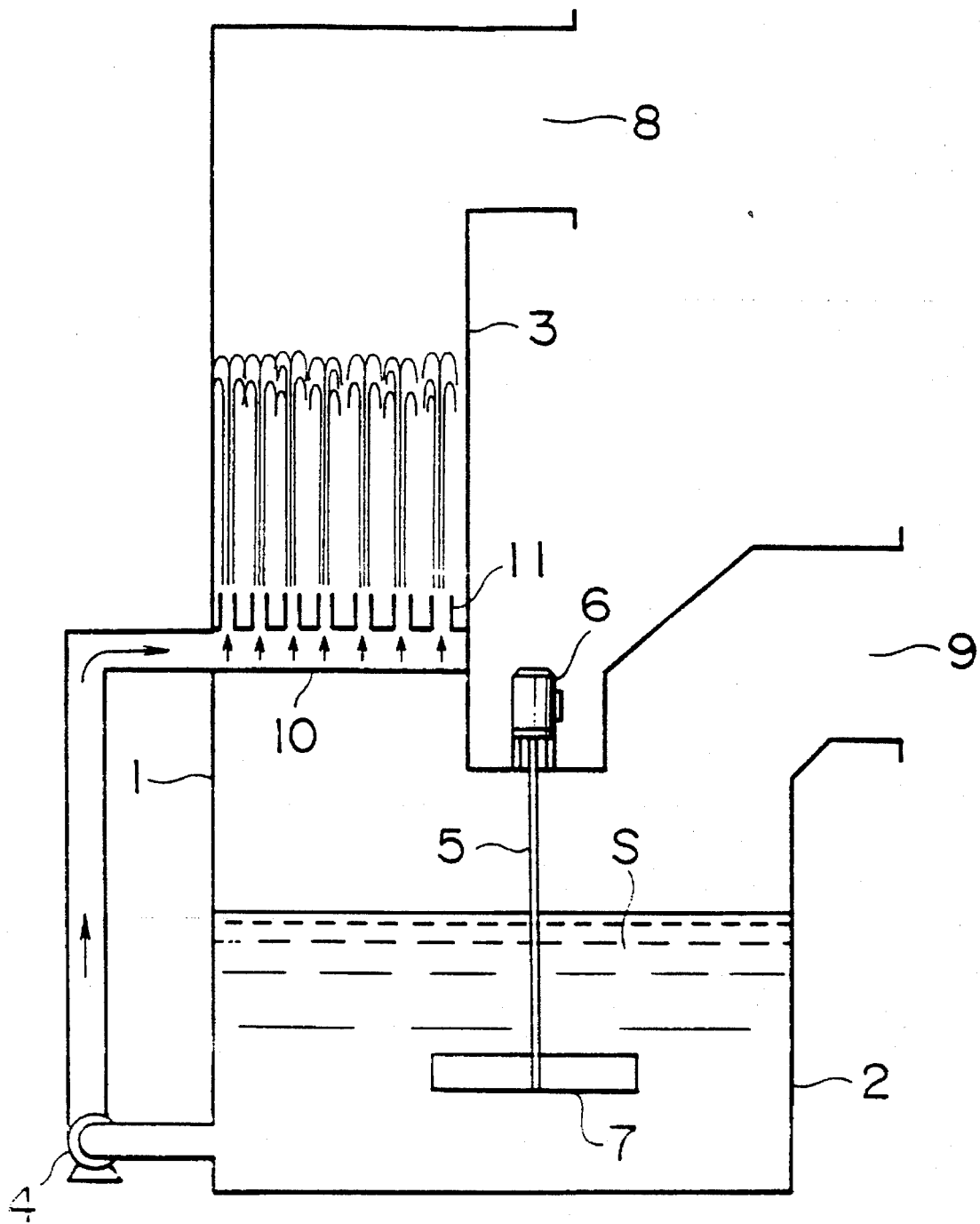
FIG. 8 is a view for illustrating the principal portion of an exhaust gas desulfurizer using a conventional gas-liquid contacting apparatus.

One embodiment of the gas-liquid contacting apparatus in accordance with the present invention will be described below with reference to the drawings. First, a desulfurizer using a gas-liquid contacting apparatus of a first embodiment is described with reference to FIGS. 1 and 2. The desulfurizer of the embodiment is characterized by the shape of its spray nozzle 20, and the other configurations are the same as those of the conventional desulfurizer shown in FIG. 8, so that the same reference numerals are applied to the same elements, and the description of the elements is omitted.

Figure 1:
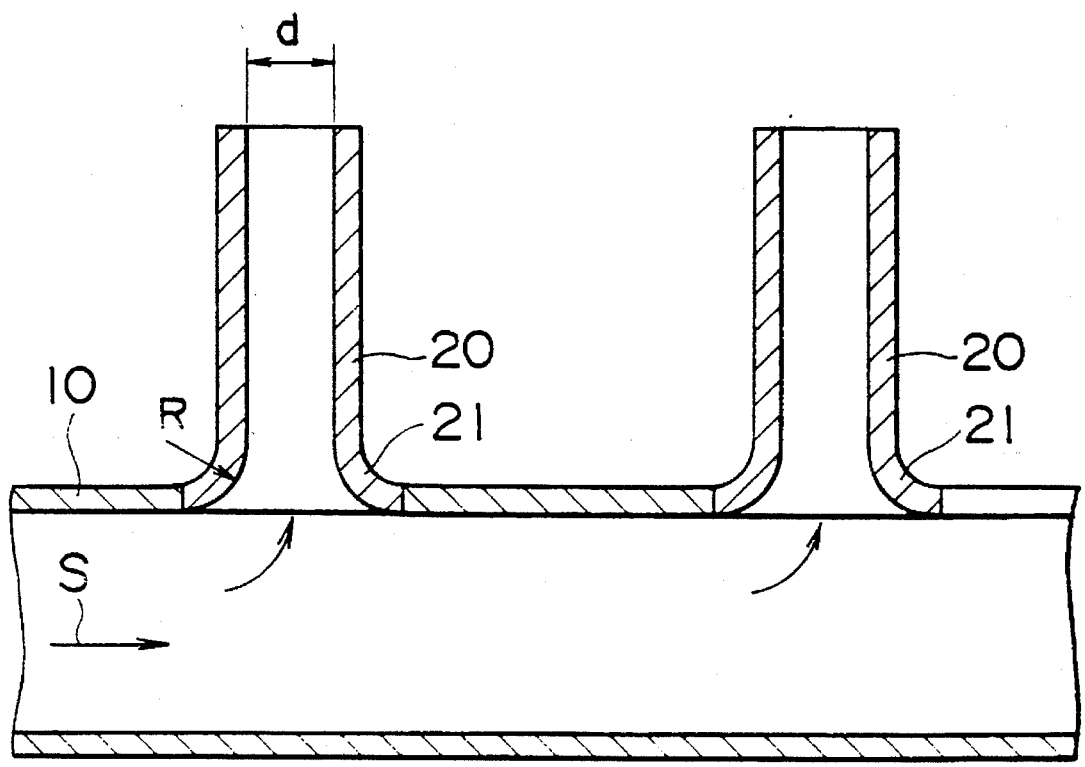
FIG. 1 is a side sectional view showing the principal portion of a gas-liquid contacting apparatus in accordance with one embodiment of the present invention.
Figure 2:
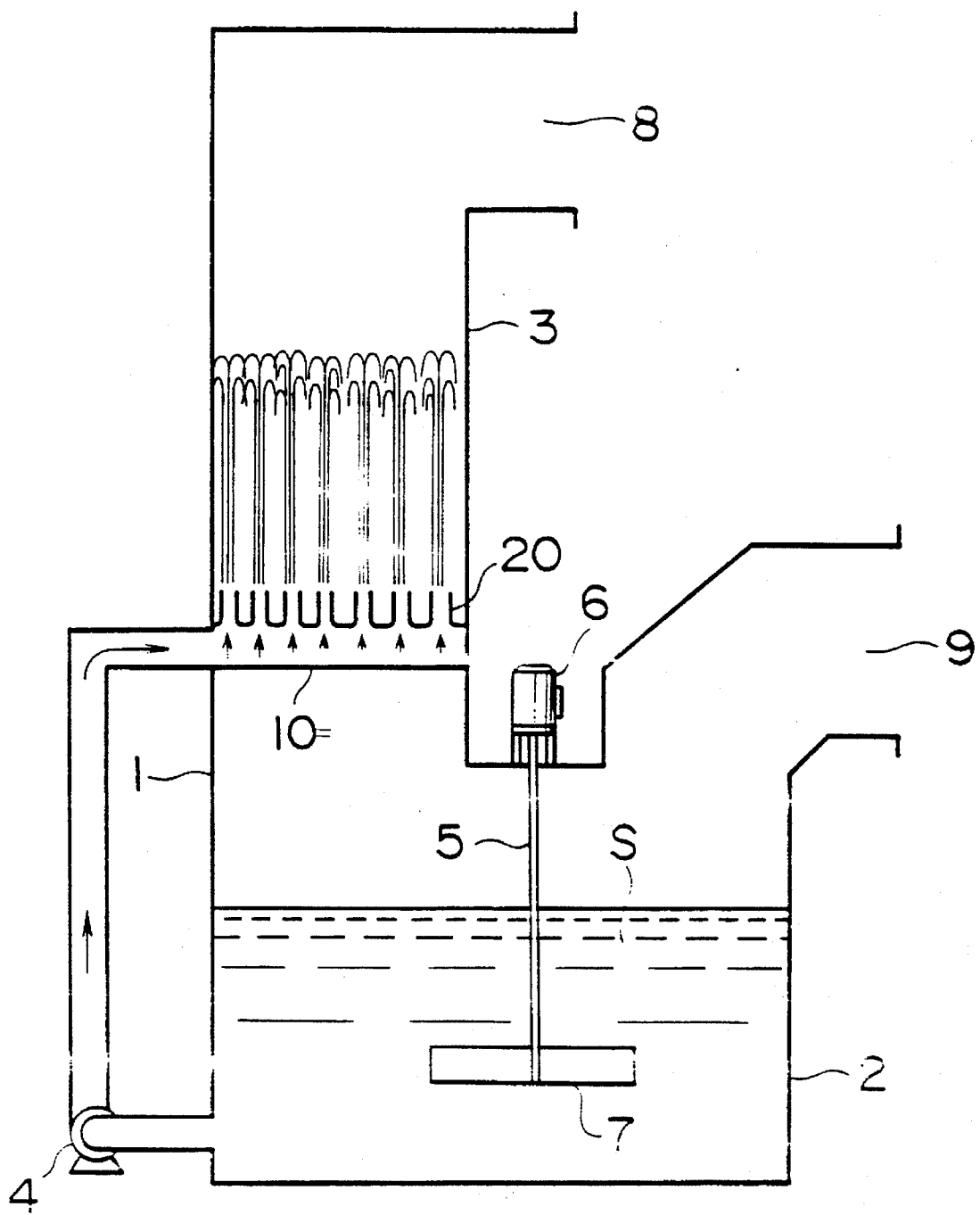
FIG. 2 is a view for illustrating the principal portion of an exhaust gas desulfurizer using a gas-liquid contacting apparatus in accordance with one embodiment of the present invention.

As shown in FIG. 2, a plurality of spray nozzles 20 of a cylindrical shape are vertically disposed by being attached to the top of a header pipe 10 in a tower body 3. As shown in FIG. 1, the liquid inlet portion 21 on the base side of the nozzle is of a bell shape having a radius of curvature R of 0.2 times or more of the liquid discharge port diameter d (usually about 50 mm). In this case, the spray nozzle 20 is made of FRP.

In the above-described desulfurizer, untreated exhaust gas is introduced through, for example, the duct 8, brought into contact with the absorbent slurry S sprayed from the spray nozzles 20 by means of the circulating pump 4 to absorb and remove sulfur dioxide gas in the untreated exhaust gas, and discharged through the duct 9 as treated exhaust gas, which provides a low-volume, simple absorption tower 1 which purifies exhaust gas with $SO_x$ removal efficiency as high as that of the conventional desulfurizer. At this time, because the liquid inlet portion 21 (refer to FIG. 1) of the spray nozzle is of a bell shape having a radius of curvature R of 0.2 times or more of the liquid discharge port diameter d, the flow turbulence of slurry solution S at the liquid inlet port and the discharge port of the spray nozzle 20 is prevented, and wear caused by the generation of bubbles or wear caused by cavitation are inhibited independently of the material of spray nozzle 20. Therefore, even if an inexpensive, lightweight material with high shock resistance, such as FRP, is used, the wear resistance can be assured, and the economy and reliability of the gas-liquid contacting apparatus and in turn the desulfurizer can be improved.

Table 1 described below lists the result of a test in which absorbent slurry S having a 20 wt % gypsum concentration is sprayed from the FRP spray nozzles 20 under the condition where the flow velocity at the discharge port is adjusted to 15 m/s, and the wear condition of the spray nozzle 20 is investigated after continuous operation for six months (sample: No. 2 to 8). Table 1 also lists the result of a test performed with conventional spray nozzles under the same conditions (sample: No. 1) for comparison. In this embodiment in which the liquid inlet portion 21 of the spray nozzle is of a bell shape having a radius of curvature R of 0.2 times or more of the liquid discharge port diameter, there is little difference in depth of wear between the liquid inlet portion and the liquid discharge port, the average depth of wear being about 12 mm. Contrarily, the spray nozzle of the conventional shape wears severely as a whole, the depth of wear being about 15 to 16 mm. The wear is especially high in the vicinity of the liquid inlet portion, and holes are found in the spray nozzle of 20 mm wall thickness.

TABLE 1

| Sample No. | Radius of curvature of expanded portion at liquid inlet of spray nozzle | Ratio of radius of curvature to diameter of liquid discharge port of nozzle | Wear observation result after continuous 6 month test |
|---|---|---|---|
| 1 | <0.5 | <0.01 | Severely worn, depth of wear is 15–16 mm, 2 through holes near inlet portion |
| 2 | 10 | 0.2 | Worn evenly from inlet portion to discharge port, depth of wear is about 11–13 mm |
| 3 | 20 | 0.4 | Worn evenly from inlet portion to discharge port, depth of wear is about 11–13 mm |
| 4 | 30 | 0.6 | Worn evenly from inlet portion to discharge port, |

TABLE 1-continued

| Sample No. | Radius of curvature of expanded portion at liquid inlet of spray nozzle | Ratio of radius of curvature to diameter of liquid discharge port of nozzle | Wear observation result after continuous 6 month test |
|---|---|---|---|
| 5 | 40 | 0.8 | depth of wear is about 11–13 mm Worn evenly from inlet portion to discharge port, depth of wear is about 11–13 mm |
| 6 | 50 | 1.0 | Worn evenly from inlet portion to discharge port, depth of wear is about 11–13 mm |
| 7 | 75 | 1.5 | Worn evenly from inlet portion to discharge port, depth of wear is about 11–13 mm |
| 8 | 100 | 2.0 | Worn evenly from inlet portion to discharge port, depth of wear is about 11–13 mm |

Second Embodiment

Next, a desulfurizer using a gas-liquid contacting apparatus of a second embodiment will be described. In the desulfurizer of this embodiment, the material of the spray nozzle 20 is polyether urethane rubber having a JIS-A hardness of 50 to 100 or ultra-high-molecular-weight polyethylene having an average molecular weight of 1,000,000 to 4,000,000. Other configurations of the machine is the same as those of the desulfurizer of the first embodiment. If the material is selected in such a manner, a lightweight, inexpensive spray nozzle with high corrosion resistance and shock resistance is provided because of the characteristics of the material itself. At the same time, high wear resistance can be obtained as shown by the test result listed in Table 2 below. Therefore, there is provided a spray nozzle which has a simple support structure (can be attached directly), and is easy to install and easy to mold, though having reliability as high as that of the ceramic spray nozzle in terms of wear resistance and corrosion resistance. Thereupon, the desulfurizer of this embodiment achieves effects of attaining great economy and significantly improving the reliability thereof.

Table 2 described below lists the result of a test in which absorbent slurry is sprayed from the spray nozzles 20 of the above material under the same condition as the test in Table 1 and the wear condition of the spray nozzle 20 is investigated after continuous operation for six months (sample: No. 1 to 10). For both polyether urethane rubber and ultra-high-molecular-weight polyethylene, the depth of wear is 0.2 mm or less, which demonstrates significant improvement in wear resistance. Comparing Table 2 with Table 1, it is evident that polyether urethane rubber having a JIS-A hardness of 50 to 100 of ultra-high-molecular-weight polyethylene having an average molecular weight of 1,000,000 to 4,000,000 has higher corrosion resistance and shock resistance than FRP.

TABLE 2

| Sample No. | Material | Ratio of expanded portion at liquid inlet to liquid discharge port diameter of 50 mm | Wear observation result after continuous 6 month test |
| --- | --- | --- | --- |
| 1 | Ultra-high-molecular-weight polyethylene (average molecular weight: 1,000,000) | 0.4 | No abnormal wear, depth of wear is not larger than 0.2 mm |
| 2 | Ultra-high-molecular-weight polyethylene (average molecular weight: 3,000,000) | 0.2 | No abnormal wear, depth of wear is not larger than 0.2 mm |
| 3 | Ultra-high-molecular-weight polyethylene (average molecular weight: 3,000,000) | 0.4 | No abnormal wear, depth of wear is not larger than 0.2 mm |
| 4 | Ultra-high-molecular-weight polyethylene (average molecular weight: 3,000,000) | 1.0 | No abnormal wear, depth of wear is not larger than 0.2 mm |
| 5 | Ultra-high-molecular-weight polyethylene (average molecular weight: 4,000,000) | 0.4 | No abnormal wear, depth of wear is not larger than 0.2 mm |
| 6 | Polyether urethane rubber (JIS-A hardness: 50°) | 0.4 | No abnormal wear, depth of wear is not larger than 0.2 mm |
| 7 | Polyether urethane rubber (JIS-A hardness: 80°) | 0.2 | No abnormal wear, depth of wear is not larger than 0.2 mm |
| 8 | Polyether urethane rubber (JIS-A hardness: 80°) | 0.4 | No abnormal wear, depth of wear is not larger than 0.2 mm |
| 9 | Polyether urethane rubber (JIS-A hardness: 80°) | 1.0 | No abnormal wear, depth of wear is not larger than 0.2 mm |
| 10 | Polyether urethane rubber (JIS-A hardness: 100°) | 0.4 | No abnormal wear, depth of wear is not larger than 0.2 mm |

The application of gas-liquid contacting apparatus of the present invention is not limited to an absorption tower in a wet type exhaust gas desulfurizer of tank oxidation type as described above, and it is apparent that the apparatus can be used in various fields having a process in which there is a need for effectively bringing gas into contact with slurry solution. Also, even when the apparatus is used for an absorption tower in a wet type exhaust gas desulfurizer, various types of apparatuses are available. For example, the apparatus can be applied to a simplified desulfurizer of a stack built-in type, in which the stack and the absorption tower are integrated, to enhance the economy and reliability thereof.

Figure 3:
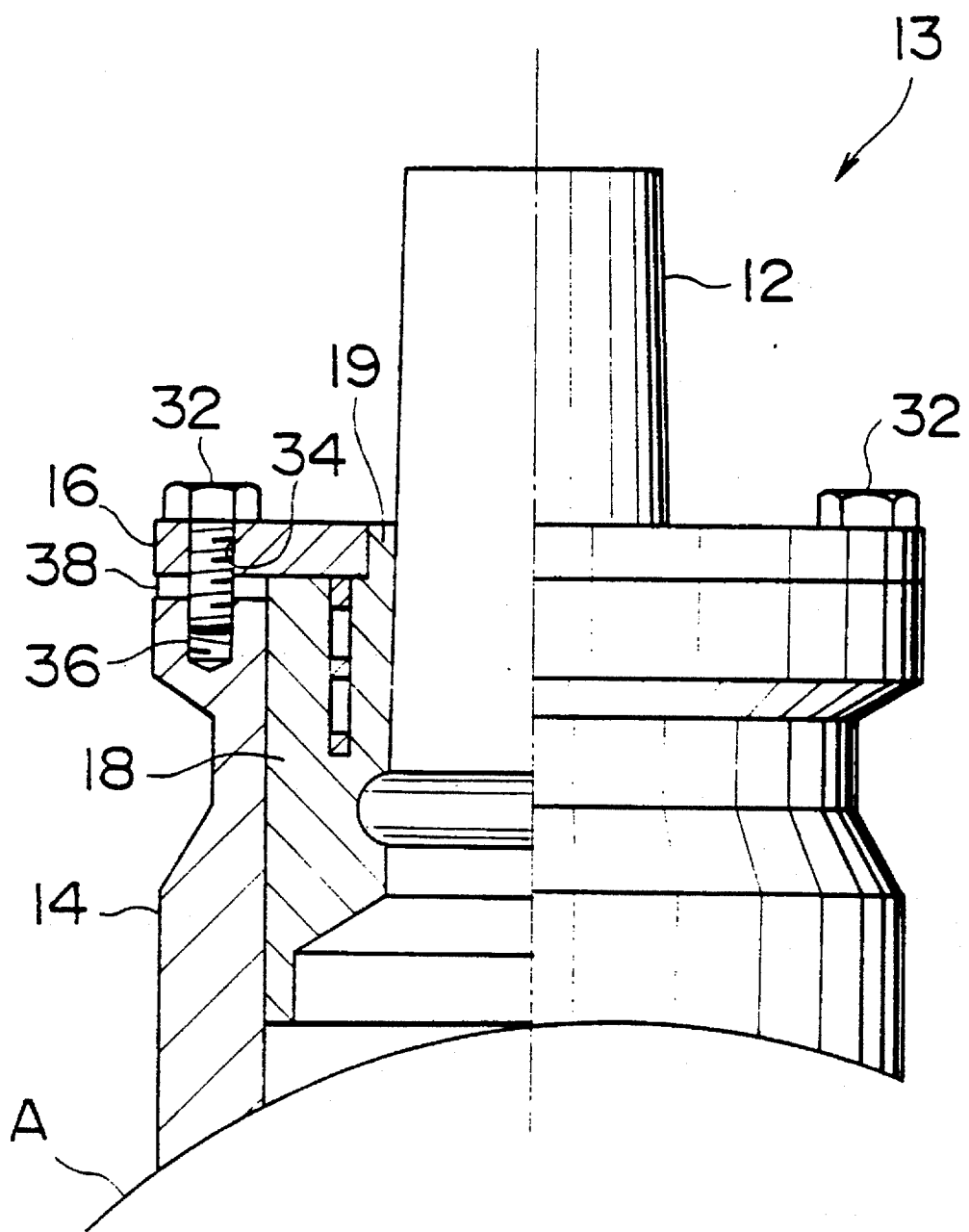
FIG. 3 is a partially sectioned side view of a ceramic nozzle support structure in accordance with the present invention.

Next, one embodiment of the ceramic nozzle support structure in accordance with the present invention will be described with reference to the drawings. FIG. 3 shows the construction of the ceramic nozzle support structure of this embodiment, FIG. 4 shows the ceramic nozzle support structures being attached to a header pipe, FIG. 5 shows the construction of a tightening flange which is fastened to a support nozzle, FIG. 6 shows the construction of nozzle, and FIG. 7 shows a mold into which the ceramic nozzle and the tightening flange are placed and which is filled with elastomeric resin.

Figure 4:
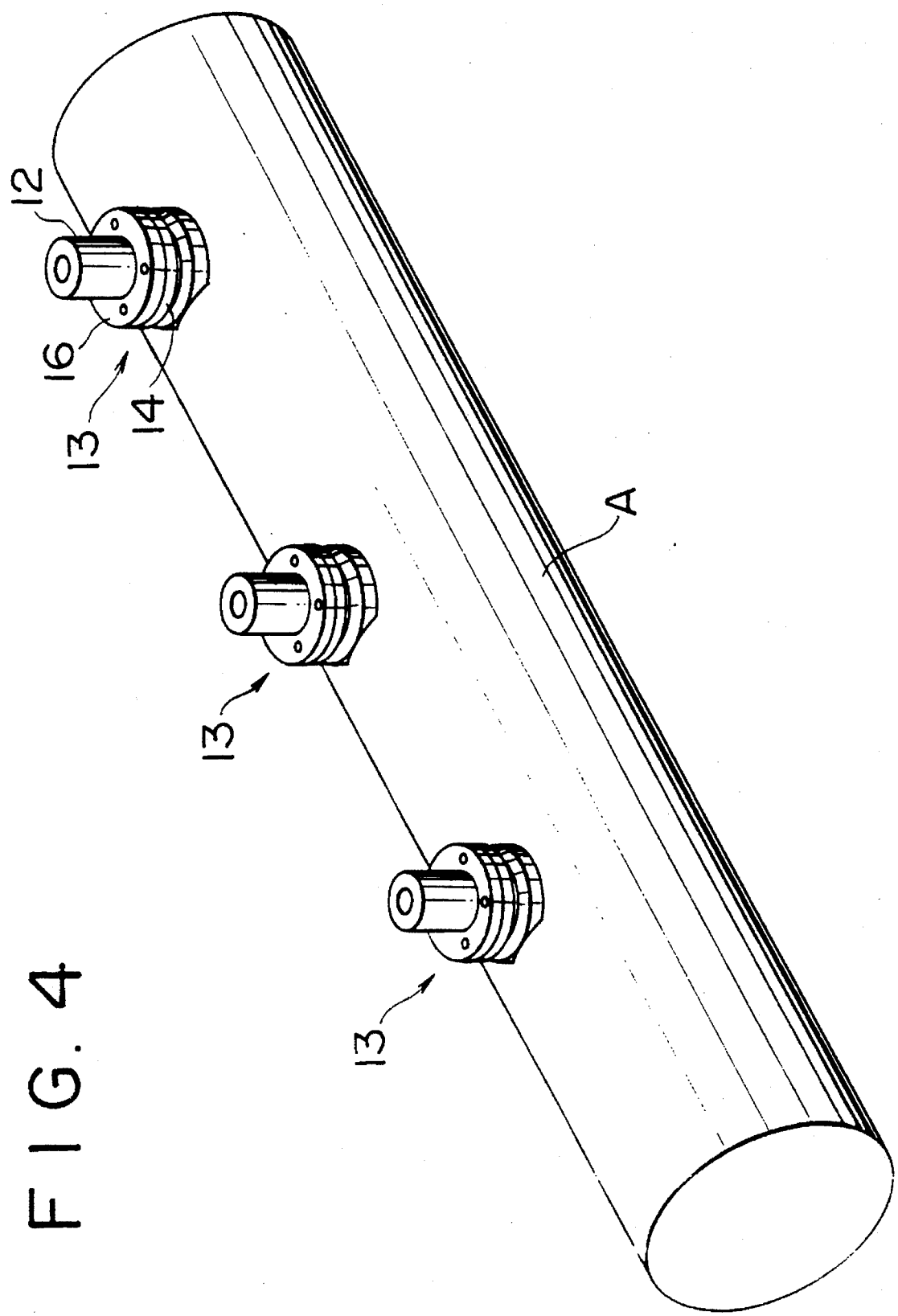
FIG. 4 is a view showing ceramic nozzle support structures of the present invention being attached to a slurry header pipe.
Figure 5:
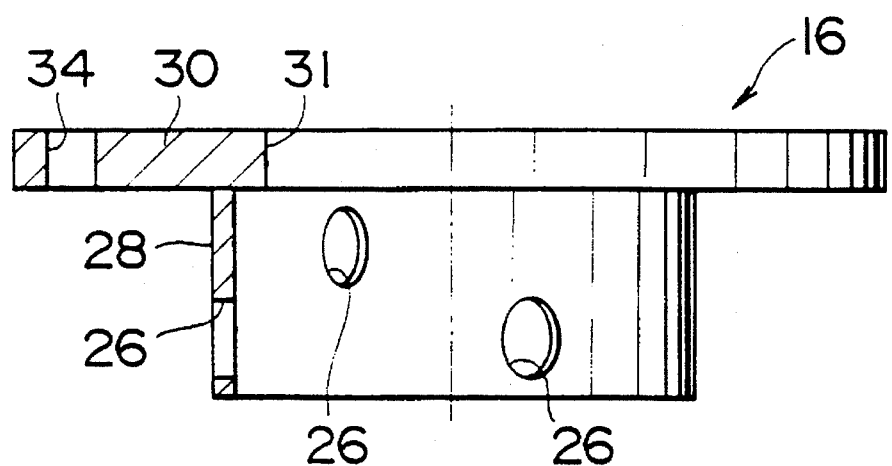
FIG. 5 is a partially sectioned side view of a tightening flange in accordance with one embodiment of the present invention.

The ceramic nozzle support structure (hereinafter, simply called support structure) 13 of this embodiment is, as shown in FIG. 4, attached to the header pipe A for limestone slurry, which is arranged in an absorption tower (not shown) of the exhaust gas desulfurizer. The support structure 13 has a construction such as to sufficiently withstand a reaction received by the nozzle even when limestone slurry of about 60 tons per hour per one nozzle is sprayed.

In this embodiment, the ceramic nozzle support structure 13 is an assembly which has the nozzle 12, the support nozzle 14 attached to the header pipe A, and the tightening flange 16 bolted to the support nozzle 14 as shown in FIG. 3, and is filled with an elastic bush between the nozzle 12 and the support nozzle 14 and between the nozzle 12 and the tightening flange 16.

Figure 6:
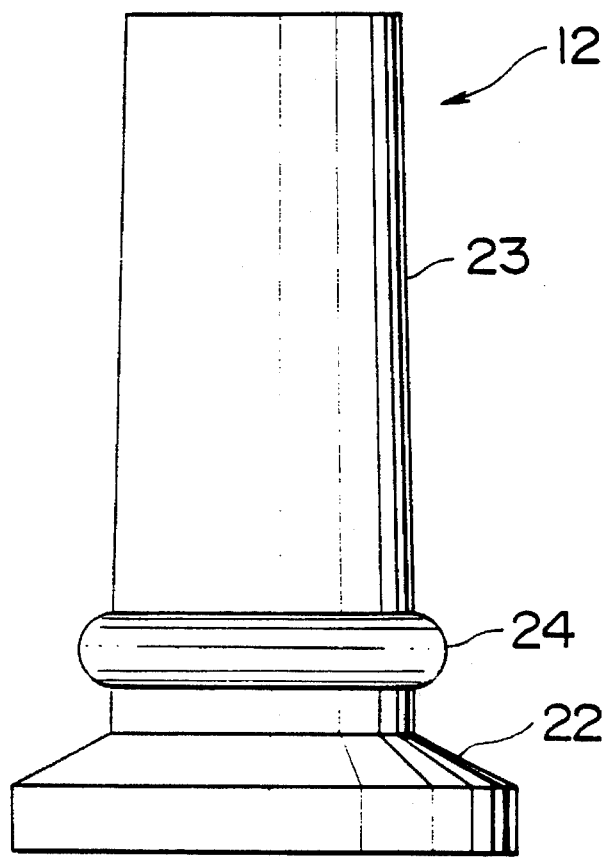
FIG. 6 is a side view of a nozzle body in accordance with one embodiment of the present invention.
Figure 7:
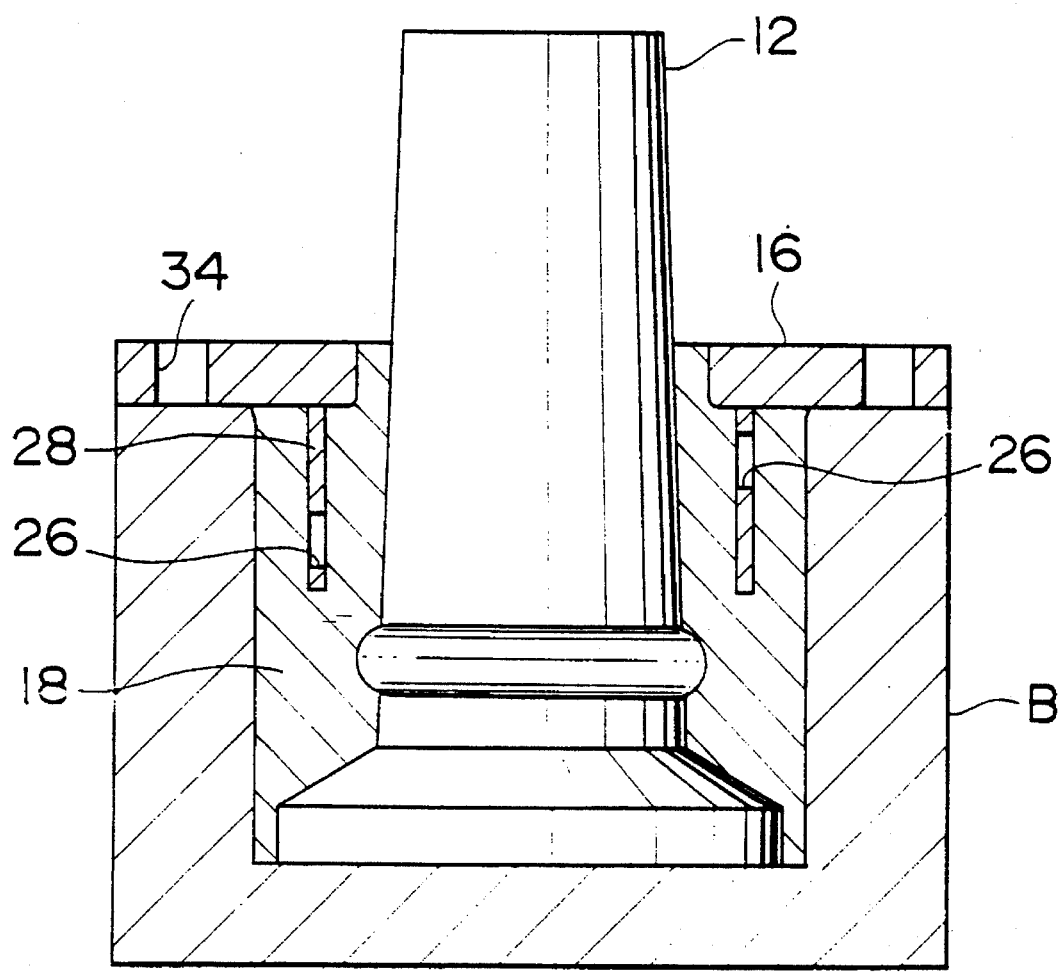
FIG. 7 is a view for illustrating one example of a method of manufacturing a ceramic nozzle support structure.

The nozzle is made of a hard ceramic material such as high-purity alumina, and comprises a substantially cylindrical nozzle body 23 and a lower skirt portion 22 as shown in FIG. 6. The skirt portion spreads downward in a tapered shape, and an annular ridge portion 24 is provided on the outer peripheral surface of the nozzle 12 near the boundary between the nozzle body 23 and the skirt portion 22.

Although the ridge portion 24 is of an annular shape in this embodiment, the ridge portion is not limited to this shape in carrying out the present invention. For example, a plurality of protrusions may be provided on the outer peripheral surface of the nozzle body 23 in a scattered spot manner as the ridge portion 24, or a plurality of annular ridge portions may be provided.

The tightening flange 16 is made of a metal, and has a central cylindrical portion 28 consisting of a cylindrical pipe and a flange body 30 connected to the upper end of the central cylindrical portion 28 as shown in FIG. 5. The flange body 30 has an aperture 31 with a diameter larger than the outside diameter of the nozzle body 20. Around the aperture, bolt holes 34 for passing tap bolts 32 (refer to FIG. 3) are provided at equal intervals. The central cylindrical portion 28 is at right angles to the flange body 30, and extends concentrically with the aperture 31. The cylindrical wall of the central cylindrical portion 28 is provided with a plurality of through holes 26.

The support nozzle 14 is made of a metal. It is a cylindrical body having an inside diameter larger than the outside diameter of the nozzle 12 including the skirt portion 22 and the outside diameter of the central cylindrical portion 28 of the tightening flange 16. The support nozzle 14 is provided with tapped holes 36 for the tap bolts 32 on the top thereof, and the lower end thereof is welded to the header pipe A for carrying slurry pressurized by the pump.

The tightening flange 16 is connected to the support nozzle 14 by bolting using the tap bolts 32 and tapped holes 36 via a packing 38 as shown in FIG. 3.

The space between the nozzle 12 and the support nozzle 14 is filled with elastomeric resin so that the elastic bush 18 is formed to integrate the outside and inside of the central cylindrical portion 28 via the through holes 26 in the central cylindrical portion 28 of the tightening flange 16. The annular clearance between the nozzle 12 and the flange body 30 of the tightening flange 16 is also filled with the extension 19 of the elastic bush 18. The elastomeric resin forming the elastic bush 18 is vulcanized butyl rubber as described later.

The support structure 13 is manufactured as shown in FIG. 7. Using a mold B of the same shape as the internal shape of the support nozzle 14, the nozzle 12 is placed at the center of the mold B. The tightening flange 16 is lowered around the nozzle 12 so that the nozzle 12 passes concentrically through the central cylindrical portion 28 of the tightening flange 12, and placed on the mold B.

Then, butyl rubber is injected to a void between the nozzle 12 and the mold B so that the void is filled with the butyl rubber, and then vulcanized and cured. By removing the mold B, a molded assembly of the nozzle 12, tightening flange 16, and the elastic bush 18 can be obtained.

Next, the molded assembly thus obtained is assembled in the support nozzle 14. As shown in FIG. 3, the tap bolt 32 is screwed in the tapped hole 36 of the support nozzle 14 via the bolt hole 34 of the tightening flange 16. By adjusting the tightness of the tap bolt 32, the tightness of the elastic bush 18 can be adjusted.

The elastic bush 18 prevents direct contact of the nozzle 12 with the support nozzle 14 and the tightening flange 16, and serves to prevent leakage of slurry by providing seal between the nozzle 12 and the support nozzle 14. In addition, the elastic bush 18 can resist the reaction caused by sprayed slurry in corporation with the ridge portion 24 of the nozzle 12.

In the above embodiment, the support structure for slurry spraying nozzle installed in an absorption tower of an exhaust gas desulfurizer used for a thermal electric power plant or other power plants has been described. However, the present invention can be applied to a ceramic nozzle support structure used in other apparatuses.

We claim:

1. A ceramic nozzle support structure comprising:

(A) a ceramic nozzle having a ridge portion on the outer peripheral surface of a nozzle body;

(B) a tightening flange including a flange body having an aperture larger than the outside shape of said nozzle body and a central cylindrical portion extending substantially concentrically with said nozzle body from lower surface of said flange body, said tightening flange having through holes in the wall of central cylindrical portion thereof; and (C) a support nozzle consisting of a cylindrical body having an inside diameter larger than said central cylindrical portion of tightening flange and connected to said tightening flange by bolting via said flange body at the upper portion of said cylindrical body, (D) an elastomeric resin filled in a space between said nozzle and said support nozzle so that the outside and inside of said central cylindrical portion of tightening flange are integrated via said through holes.

* * * * *